US011409665B1

United States Patent
Fu et al.

(10) Patent No.: US 11,409,665 B1
(45) Date of Patent: Aug. 9, 2022

(54) PARTIAL LOGICAL-TO-PHYSICAL (L2P) ADDRESS TRANSLATION TABLE FOR MULTIPLE NAMESPACES

(71) Applicant: Innogrit Technologies Co., Ltd., Shanghai (CN)

(72) Inventors: Bo Fu, Cupertino, CA (US); Lin Chen, Cupertino, CA (US); Jie Chen, Milpitas, CA (US); Cheng-Yun Hsu, Taichung (TW)

(73) Assignee: Innogrit Technologies Co., Ltd., Shanghai (CN)

( * ) Notice: Subject to any disclaimer, the term of this patent is extended or adjusted under 35 U.S.C. 154(b) by 0 days.

(21) Appl. No.: 17/315,575

(22) Filed: May 10, 2021

(51) Int. Cl.
*G06F 12/109* (2016.01)
*G06F 12/1009* (2016.01)

(52) U.S. Cl.
CPC ........ *G06F 12/109* (2013.01); *G06F 12/1009* (2013.01); *G06F 2212/657* (2013.01)

(58) Field of Classification Search
CPC ............. G06F 12/1009; G06F 12/1036; G06F 12/109; G06F 2212/7201; G06F 2212/657; G06F 2212/152; G06F 2212/651
See application file for complete search history.

(56) References Cited

U.S. PATENT DOCUMENTS

2017/0068621 A1\* 3/2017 Watanabe ............. G06F 3/0679
2019/0339904 A1\* 11/2019 Myran .................. G06F 3/0688

\* cited by examiner

*Primary Examiner* — Gary W. Cygiel
(74) *Attorney, Agent, or Firm* — IPro, PLLC; Xiaomin Huang

(57) ABSTRACT

Systems, apparatus and methods are provided for using a partial logical-to-physical (L2P) address translation table for multiple namespaces to perform address translation. An exemplary embodiment may provide a method comprising: receiving a request for a first logical data address (LDA) that belongs to a first namespace (NS); searching the first NS in an entry location table (ELT) for all namespaces whose L2P entries always reside in memory; determining that the first NS is not in the ELT; searching a cache of lookup directory entries of recently accessed translation data units (TDUs) for a first TDU containing a L2P entry for the first LDA; determining that there is a cache miss; retrieving the lookup directory entry for the first TDU from an in-memory lookup directory and determining that it is not valid; reserving a TDU space for the first TDU; and generating a load request for the first TDU.

21 Claims, 5 Drawing Sheets

PARTIAL LOGICAL-TO-PHYSICAL (L2P) ADDRESS TRANSLATION TABLE FOR MULTIPLE NAMESPACES

TECHNICAL FIELD

The disclosure herein relates to non-volatile storage systems, particularly relates to logical-to-physical address translation in non-volatile storage controllers.

BACKGROUND

Computing systems have traditionally used a wide variety of non-volatile storage devices to maintain and store data and instructions, for example, floppy disks, hard drives, magnetic tapes, optical discs. More recently, non-volatile storage devices have gained wide usage in memory cards, USB flash drives and solid-state drives (SSDs). Data is stored in the non-volatile storage devices according to physical data addresses. But the host computers normally access the data using logical data addresses so logical-to-physical translation tables are needed by the storage controllers.

Most storage controllers store a full logical-to-physical (L2P) address translation table in the memory space for the controller to speed up the data access. As the density of non-volatile storage device increases, this approach will require a large size of memory space of the controller, which will increase the cost of non-volatile storage systems (e.g., SSDs). It also becomes very challenging to put enough memory on the PCB for a non-volatile storage system with a small form factor, for example, the M.2 format factor. Therefore, there is a need in the art to efficiently utilize the memory space used for logical-to-physical address translation in non-volatile storage controllers.

SUMMARY

The disclosed subject matter relates to systems, methods, and devices that provide logical-to-physical (L2P) address translation in storage controllers of non-volatile storage systems. The techniques of using a partial L2P address translation table in storage controllers described herein may efficiently make use of the memory space used for L2P address translation in storage controllers. The storage capacity of a non-volatile storage system may be divided into a plurality of namespaces and the namespaces may be categorized into two types. For the first type, corresponding L2P entries may be loaded and kept in the memory of the storage controller; for the second type, corresponding L2P entries to other namespaces may be loaded and swapped out as needed. Therefore, at any time, only a subset of entries of a full L2P address translation table may be loaded into the memory of a storage controller.

For L2P entries that may be loaded and kept in memory, a namespace L2P Entry Location Table (NS-L2P-ELT) may be maintained. When a read or write request with namespace identifier (NSID) i and LDA j is received, the NSID i may be used to check NS-L2P-ELT. If NSID i hits a valid table entry, the start memory address of this entry will be used to access the L2P entries of the namespace with NSID i in DRAM. For L2P entries that may be loaded and swapped out of the memory as needed, an in-memory lookup directory may be maintained. The number of entries of the lookup directory may match the number of entries of translation data units (TDUs) that contain L2P entries in a full L2P address translation table. The lookup directory may keep track of which TDUs have been loaded into the memory space of the storage controllers.

Every time when a TDU is loaded from a non-volatile storage device to the memory of the storage controller or flushed from the memory of the storage controller to the non-volatile storage device, the corresponding lookup directory entry may be updated. A TDU may be loaded into any available TDU space in the memory of the storage controller and the lookup directory may keep track of where in the memory the TDU is loaded into. If the lookup directory entry for a TDU is invalid, it means that this TDU has not been loaded into the memory of the storage controller and a load request for this TDU may be sent to the non-volatile storage device.

In an exemplary embodiment, there is provided a method that may comprise: receiving a request for a first logical data address (LDA) that belongs to a first namespace (NS); searching the first NS in an entry location table (ELT) for all namespaces whose L2P entries always reside in memory; determining that the first NS is not in the ELT; searching a cache of lookup directory entries of recently accessed translation data units (TDUs) for a first TDU using a first TDU index obtained from the first LDA, the first TDU containing a logical-to-physical (L2P) entry for the first LDA; determining that the cache does not have a lookup directory entry for the first TDU; retrieving the lookup directory entry for the first TDU from an in-memory lookup directory in a memory; determining that the lookup directory entry for the first TDU is not valid; reserving a TDU space for the first TDU in the memory; and generating a load request for the first TDU.

In another exemplary embodiment, there is provided an apparatus that may comprise: a processor, and a logical-to-physical (L2P) translation engine. The L2P translation engine may comprise an entry location table (ELT) for all namespaces whose L2P entries always reside in memory and a cache of lookup directory entries of recently accessed translation data units (TDUs). The L2P translation engine may be configured to: receive a request for a first logical data address (LDA) that belongs to a first namespace (NS) from the processor; search the first NS in the ELT; determine that the first NS is not in the ELT; search the cache for a first TDU using a first TDU index obtained from the first LDA, the first TDU containing a logical-to-physical (L2P) entry for the first LDA; determine that the cache does not have a lookup directory entry for the first TDU; retrieve the lookup directory entry for the first TDU from an in-memory lookup directory in a memory; determine that the lookup directory entry for the first TDU is not valid; reserve a TDU space for the first TDU in the memory; and generate a load request for the first TDU.

In yet another exemplary embodiment, disclosed herein may also include a non-transitory machine-readable medium having executable instructions, that the executable instructions, when executed by a storage controller, may cause the storage controller to: receive a request for a first logical data address (LDA) that belongs to a first namespace (NS); search the first NS in an entry location table (ELT) for all namespaces whose L2P entries always reside in memory; determine that the first NS is not in the ELT; search a cache of lookup directory entries of recently accessed translation data units (TDUs) for a first TDU using a first TDU index obtained from the first LDA, the first TDU containing a logical-to-physical (L2P) entry for the first LDA; determine that the cache does not have a lookup directory entry for the first TDU; retrieve the lookup directory entry for the first TDU from an in-memory lookup directory in a memory;

determine that the lookup directory entry for the first TDU is not valid; reserve a TDU space for the first TDU in the memory; and generate a load request for the first TDU.

DETAILED DESCRIPTION

Figure 1A:
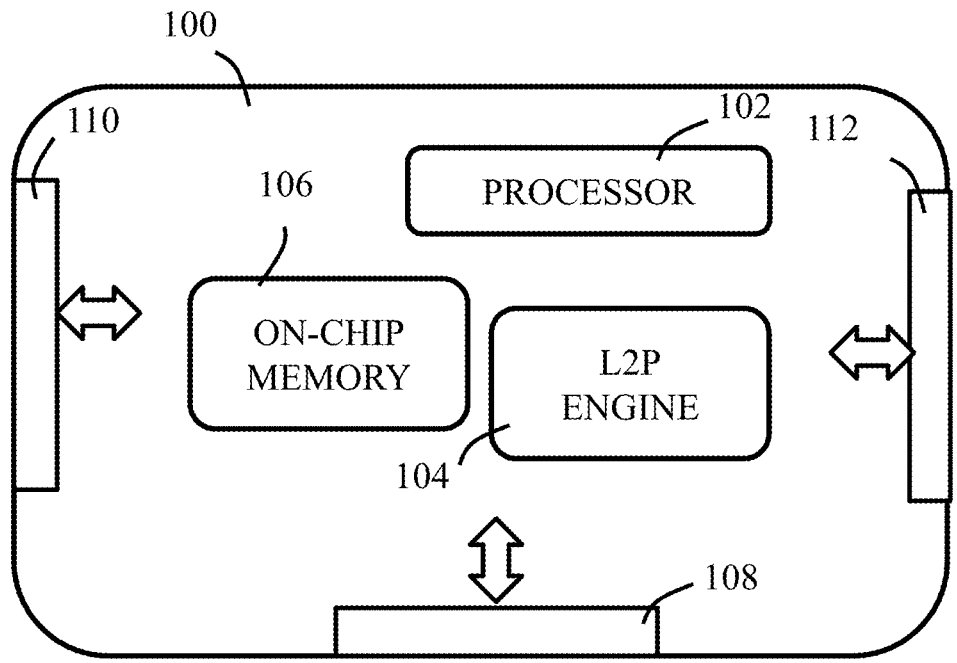
FIG. 1A schematically shows a non-volatile storage controller in accordance with an embodiment of the present disclosure.

Specific embodiments according to the present disclosure will now be described in detail with reference to the accompanying figures. Like elements in the various figures are denoted by like reference numerals for consistency.

The present disclosure provides apparatuses, systems and methods that support various high-speed non-volatile memory (NVM) devices and any combination of various NVM devices. As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

FIG. 1A schematically shows an exemplary non-volatile storage controller 100 according to an embodiment. The non-volatile storage controller 100 may comprise a first interface 110, a second interface 112, a third interface 108, a microcontroller unit (MCU) 102, an on-chip memory 106 and a logical-to-physical (L2P) engine 104. The first interface 110 may be any existing or yet to be developed interface that is configured to couple the non-volatile storage controller 100 to a system bus of a host computing system, and receive data from and transmit data to the host computing system. In one embodiment, for example, the first interface 110 may be a Peripheral Component Interconnect express (PCIe) interface. The second interface 112 may be any existing or yet to be developed interface that is configured to couple the storage controller 100 to one or more non-volatile storage memory (NVM) devices. In one embodiment, the second interface 112 may be a multi-channel interface that may be configured to transfer encoded data (e.g., ECC codewords) over multiple channels in parallel. For example, the second interface 112 may be an Open NAND Flash Interface (ONFI) that may support different protocols (e.g., Non-volatile Double Data Rate (NVDDR), NVDDR Type 2 (NVDDR2,) NVDDR Type Three (NVDDR3)), or may be Toggle protocols and run at different transfer speeds. In general, there may be one or a plurality of non-volatile storage devices coupled to the second interface 112. The third interface 108 may be any existing or yet to be developed interface (e.g., Double Data Rate (DDR), DDR Type 2 (DDR2), or DDR Type Three (DDR3)) that is configured to couple the storage controller 100 to an off-chip memory, for example, a dynamic random-access memory (DRAM).

The MCU 102 may be a computer processor configured to execute executable instructions (e.g., software or firmware). In various embodiments, the MCU 102 may be a microprocessor, a microcontroller, a field-programmable gate array (FPGA), or an application-specific IC (ASIC). The non-volatile storage controller 100 may receive commands from the host via the first interface 110, for example, to store data to the non-volatile storage system (e.g., a write command) or to read data stored in the non-volatile storage system (e.g., a read command). The commands from the host may use the logical block address (LBA) and the non-volatile storage devices may use the physical block address (PBA). LBA needs to be translated to the physical block address (PBA) at the storage controller 100. This L2P address translation may be processed by using a L2P address translation table, each entry of which may be the PBA used to store the data. In one embodiment, the non-volatile storage controller 100 may process the data in terms of a data unit (DU). The LBA for a data unit may be a logical data unit address (LDA) and the PBA for a data unit may be a physical data unit address (PDA).

The L2P address translation table may be stored in one or among a plurality of non-volatile storage devices coupled to the second interface 112. When the non-volatile storage system powers on, instead of loading the whole L2P address translation table, a subset of entries of the L2P address translation table may be loaded into the memory space of the non-volatile storage controller 100 (e.g., the on-chip memory 106 or an off-chip memory coupled to the controller 100 via the third interface 108). The subset of entries of the L2P address translation table may also be referred to as a partial L2P address translation table. In some embodiments, a lookup directory may be used to keep track of which translation data unit (TDU) has been loaded into the memory space of the controller 100. A TDU may be loaded into any available TDU space in the memory space and a corresponding entry in the lookup directory may contain the memory location of the TDU.

In an embodiment, the total usable storage capacity of the non-volatile storage device(s) coupled to the second interface 112 may be divided by the controller 100 into a plurality of namespaces. For example, in a non-volatile storage system, there may be L non-volatile storage devices coupled to the second interface 112 of the non-volatile storage controller 100 and the usable storage capacity of L non-volatile storage devices may be divided into T namespaces, and L and T may be positive integers but not necessarily equal in value. Each of the T namespaces may be logically separate and have individually addressable storage spaces, which may have different format, features, integrity protection (e.g., cyclic redundancy check (CRC)), etc. It should be noted that the storage spaces for different namespaces may have equal sizes or different sizes.

The L2P engine 104 may be configured to manage the partial L2P address translation table for a storage space with multiple namespaces. Namespaces may be categorized into two types and L2P entries belonging to each type of namespaces may be treated differently. L2P entries belonging to the namespaces of one type, referred to as a first type, may be loaded into the memory space of the controller 100 and always reside in memory like in a full L2P table solution. In contrast, L2P entries belonging to the namespaces of another type, referred to as a second type, may be loaded when they are needed and flushed afterwards (e.g., when memory space is needed).

The criteria for categorizing a namespace in the first type may include the feature of individual namespace. In one embodiment, a namespace having a high-performance requirement (e.g., accessed frequently and/or a low latency), such as the namespace of the operating system, may be categorized into the first type and corresponding L2P entries may always reside in memory. Meanwhile, a namespace whose performance is not critical may be categorized into the second type and corresponding L2P entries may be swapped in and out of the memory as needed.

Figure 1B:
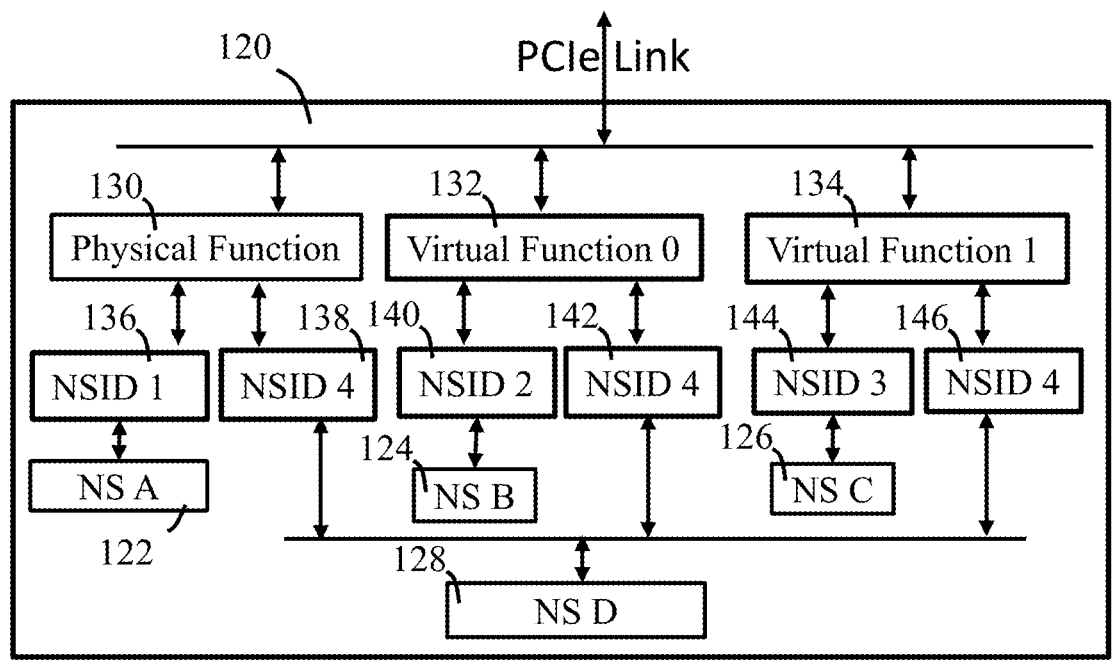
FIG. 1B schematically shows a plurality of namespaces in a non-volatile storage system in accordance with an embodiment of the present disclosure.

FIG. 1B schematically shows a plurality of namespaces in a non-volatile storage system 120 in accordance with an embodiment of the present disclosure. The storage space of the non-volatile storage system 120 may be divided into a plurality of namespaces, for example, NS A 122, NS B 124, NS C 126 and NS D 128. The non-volatile storage system 120 may be a storage system for a computing system that may implement a virtualization technique (e.g., single root I/O virtualization). Each virtual machine of the computing system may be given a respective direct access to a hardware resource (e.g., the non-volatile storage system 120) in the form of a virtual function. Therefore, the non-volatile storage system 120 may provide a physical function 130 and a plurality of virtual functions (e.g., the virtual function 0 132 and virtual function 1 134) via a PCIe link. Each namespace of the non-volatile storage system 120 may be assigned a namespace identifier (NSID), for example, NSID 1 for NSA 122, NSID 2 for NS B 124, NSID 3 for NS C 126 and NSID 4 for NS D 128. The computing system may access the different namespaces NS A 122, NS B 124, NS C 126 and NS D 128 using the physical function 130 or one of the virtual functions (e.g., the virtual function 0 132 or virtual function 1 134). For example, the physical function 130 may be invoked with the NSID 1 136 to access NS A 122, or with NSID 4 138 to access NS D 128; also, the virtual function 0 132 may be invoked with the NSID 2 140 to access NS B 124, or with NSID 4 142 to access NS D 128; and the virtual function 1 134 may be invoked with the NSID 3 144 to access NS C 126, or with NSID 4 146 to access NS D 128.

Figure 2:
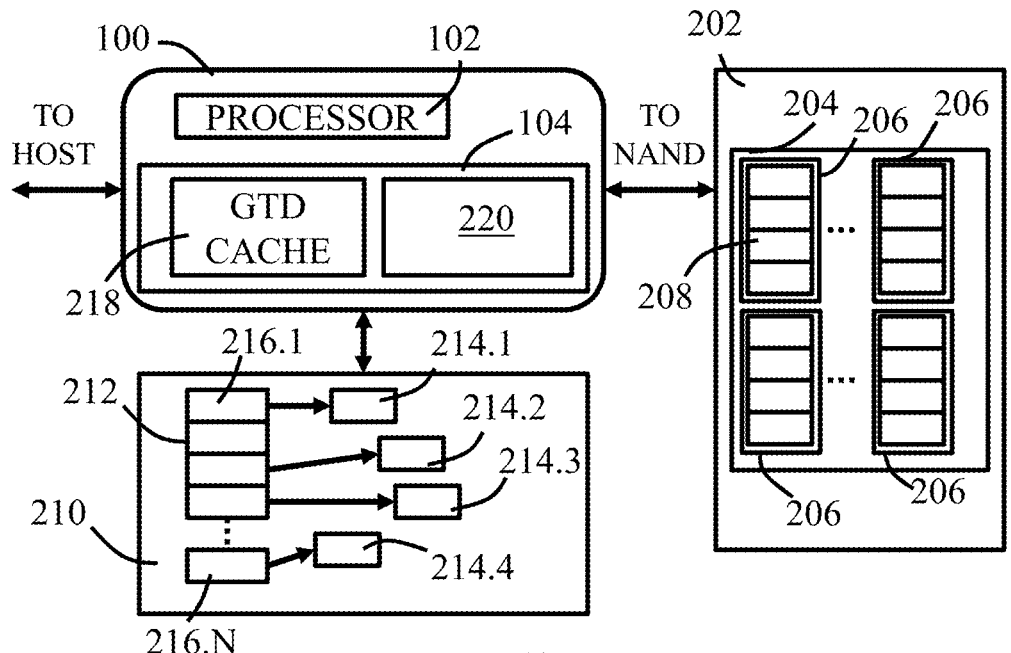
FIG. 2 schematically shows using a partial logical-to-physical address translation table to perform L2P translation in accordance with an embodiment of the present disclosure.

FIG. 2 schematically shows using a partial logical-to-physical address translation table to perform L2P translation in accordance with an embodiment of the present disclosure. A full L2P address translation table 204 may be stored in a non-volatile storage device 202 (or spread among multiple NVM devices) coupled to the non-volatile storage controller 100 (e.g., via the second interface 112). The L2P address translation table 204 may be stored in a plurality of NVM pages. Each of the NVM page used to store entries of the L2P table 204 may be referred to as a translation page (TP). As shown in FIG. 2, the L2P table 204 may comprise a plurality of TPs 206. A data unit (DU) used to store entries of the L2P table may be referred to as a translation DU (TDU). Each TP 206 may comprise a plurality of TDUs. One representative TDU 208 is labeled in FIG. 2. Each namespace may have its own storage capacity and address range, and corresponding L2P entries for each namespace may be stored in one or a plurality of TDUs, respectively.

In one embodiment, if a PDA is 4-Byte, a 16-KibiByte (KiB) TP may store 4096 L2P entries. If a 16-KiB TP contains four TDUs, each TDU may have 1024 L2P entries. A TP index may be used as an identifier to identify a TP and calculated by dividing the LDA with the number of L2P entries in the TP. For example, assuming in one embodiment the LDA may be 32 bits, for a 16-KiB TP with 4096 L2P entries, the TP index may be set to equal to the most significant 20 bits of the LDA, which may be represented as LDA[31:12]. Similarly, for a 4-KiB TDU with 1024 L2P entries, a TDU index be used as an identifier to identify a TDU and may be set to equal to the most significant 22 bits of the LDA, which may be represented as LDA[31:10].

As shown in FIG. 2, a lookup directory 212 may be maintained in a dynamic random-access memory (DRAM) 210 coupled to the non-volatile storage controller 100. Assume that the full L2P table 204 stored in the non-volatile storage device 202 may have a total of N TDUs, DRAM 210 may need to provide a space for M TDUs, in which both N and M may be positive integers and N may be much larger than M (e.g., M TDUs in the DRAM 210 being a subset of N TDUs of L2P table 204). The lookup directory 212 may have N entries (e.g., 216.1 through 216.N), which may match the number of all TDUs. In one embodiment, the lookup directory 212 may be an in-memory lookup directory and referred to as a global translation directory (GTD). Each entry of the lookup directory 212 may be referred to as a lookup directory entry or a GTD entry. The lookup directory 212 may keep track of which TDU belonging to the second type of namespaces has been loaded into DRAM 210 and the memory location of the loaded TDUs in the DRAM 210. Every time when a TDU belonging to the second type of namespaces is loaded from the non-volatile storage device 202 to DRAM 210 or flushed from DRAM 210 to the non-volatile storage device 202, the corresponding GTD entry may be updated. By using the lookup directory 212, one TDU may be loaded into any available TDU space in the DRAM 210.

Figure 3A:
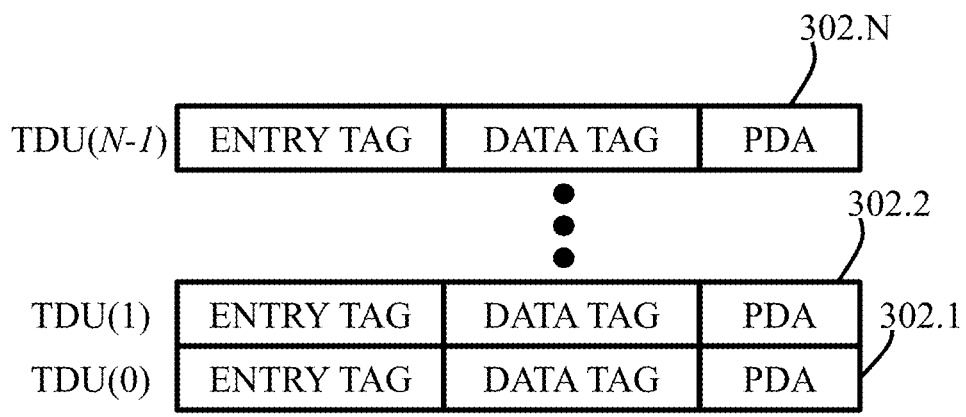
FIG. 3A schematically shows a plurality of entries for a lookup directory in accordance with an embodiment of the present disclosure.

FIG. 3A schematically shows a plurality of entries 302.1 through 302.N for a lookup directory in accordance with an embodiment of the present disclosure. The lookup directory may be implemented as a global translation directory (GTD) in one embodiment. Each of the lookup directory entries 302.1 through 302.N may be identified by a TDU index TDU(i) with "i" being any one of zero to N−1, and each of the lookup directory entries 302.1 through 302.N may comprise three fields. The first field may be an entry tag. The second field may be a data tag, which may be a memory address pointing to the DRAM location in the DRAM 210 used to store the TDU. The third part may be the PDA of TDU (e.g., the location of where the TDU is stored in the non-volatile storage device 202).

Figure 3B:
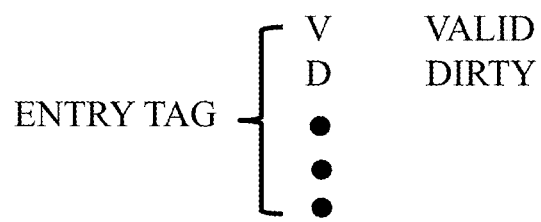
FIG. 3B schematically shows an entry tag for a lookup directory entry in accordance with an embodiment of the present disclosure.

FIG. 3B schematically shows an entry tag for a lookup directory entry in accordance with an embodiment of the present disclosure. The entry tag may comprise a plurality of bits. At a minimum, the entry tag may include a validity bit and a dirty bit. The validity bit may be used to indicate whether the TDU has been loaded into the DRAM. For example, if a TDU is already loaded into the DRAM 210, its corresponding lookup directory entry is valid and the validity bit may be 1; and if a TDU is not in the DRAM 210, its corresponding lookup directory entry is invalid and the validity bit may be 0. The dirty bit may be used to indicate whether the TDU in the DRAM 210 is dirty (e.g., containing one or more modified L2P entries and being different from the TDU in the non-volatile storage device 202). For example, if a TDU in the DRAM 210 is dirty, it may need to be flushed to the non-volatile storage device 202 to update the L2P address translation table 204. In some embodiments, the entry tag may include one or more other bits in addition to the validity bit and dirty bit.

Referring back to FIG. 2, the L2P engine 104 may comprise a GTD cache 218 and a namespace L2P Entry Location Table (NS-L2P-ELT) 220. The GTD cache 218 may be a cache for GTD entries (e.g., recently accessed GTD entries). The NS-L2P-ELT 220 may be used to obtain L2P entries for first type of namespaces. In some embodiments, when a namespace with NSID i is created, firmware (e.g., software instructions executed by the processor 102) will check the feature of this namespace. If it requires a high performance, firmware may load the L2P address translation table entries belonging to this namespace to the DRAM 210 and initialize the corresponding entry in NS-L2P-ELT 220.

Figure 4:
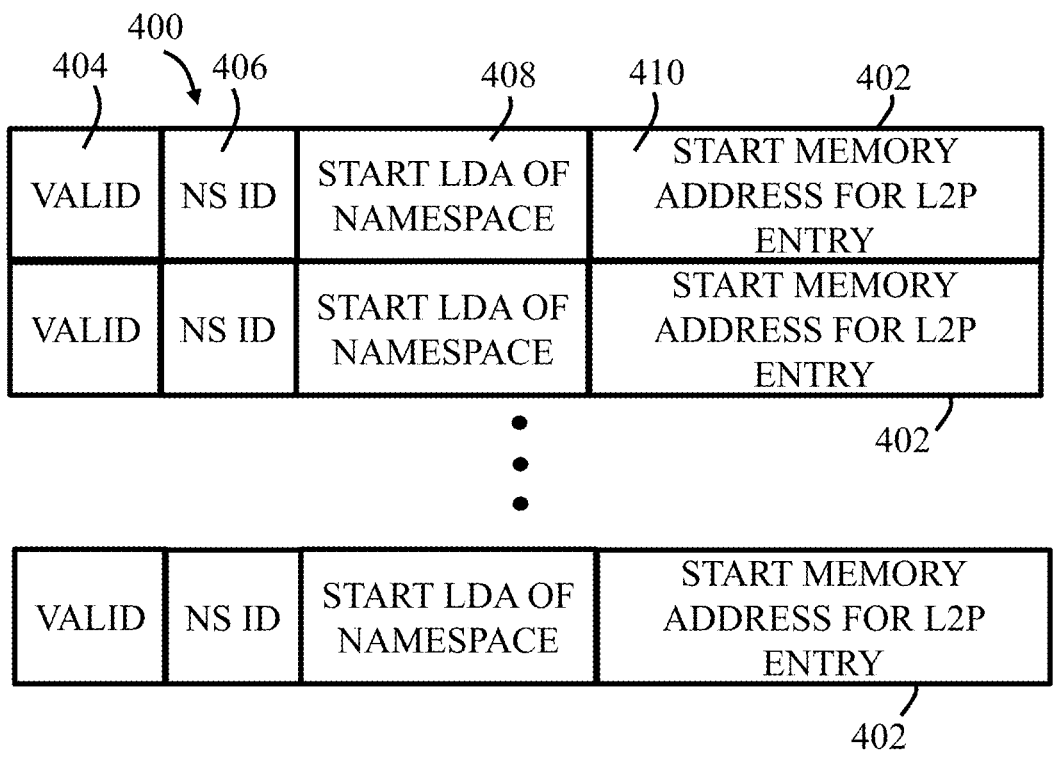
FIG. 4 schematically shows a namespace L2P entry location table (NS-L2P-ELT) in accordance with an embodiment of the present disclosure.

The NS-L2P-ELT 220 may be used to keep track the DRAM address of the L2P entry of the first type of namespaces (e.g., those L2P entries always stay in DRAM). FIG. 4 schematically shows a NS-L2P-ELT 400 in accordance with an embodiment of the present disclosure. The NS-L2P-ELT 400 may be an embodiment of the NS-L2P-ELT 220 and used to keep track the DRAM address of the L2P entries that may always stay in DRAM (e.g., L2P entries for the namespaces of the first type). The NS-L2P-ELT 400 may comprise a plurality of entries 402. Each entry 402 may comprise four parts: a valid bit field 404, a NS ID field 406, start LDA of the namespace field 408, and start memory address for L2P entry field 410. In one embodiment, LDAs for a namespace of a first type may be consecutive and the first LDA of the namespace may be mapped to the start LDA of the namespace field 408. The L2P entries for the namespace may be loaded into the DRAM 210 and stored in consecutive memory space of the DRAM 210, and the start memory address for the L2P entries of the namespace may be stored in the start memory address for L2P entry field 410.

Referring back to FIG. 2, when the L2P engine 104 receives a command (e.g., read or write) with NSID i and LDA j, the namespace identifier NSID i may be used to check the NS-L2P-ELT 220. NSID i may be a valid namespace identifier and "j" may be a valid number for LDA (e.g., a 32-bit number for a 32-bit address). If NSID i hits a valid table entry, the start memory address for L2P entries of the namespace in the field 410 of the hit entry of NS-L2P-ELT 220 may be used to access the L2P entries for the namespace with NSID i in DRAM 210. In one embodiment, the corresponding L2P entry for LDA j may be obtained from the memory address calculated as: (j minus the value in the start LDA of namespace field 408) multiplied by the number of bytes per L2P entry, and then the multiplication result plus the value in the start memory address for L2P Entry field 410. For example, if j is 10000, the start LDA of namespace NSID i is 9980, the number of bytes per L2P entry is 4 and the start memory address for L2P entries is 1000, then the corresponding L2P entry for LDA j may be obtained from the memory address by (10000−9980)*4+ 1000, which is 1080.

If NSID i has no hit in the NS-L2P-ELT 220, LDA j may belong to a namespace of the second type and may be used to check the GTD cache 218 and then the GTD 212. For example, the TDU index for this LDA j may be calculated (e.g., obtaining LDA j [31:10]). The GTD cache 218 may be checked for this TDU(j). If the GTD entry for TDU(j) is found in the GTD cache 218, data tag in the cached GTD entry may be used to locate the L2P entry for LDA j and the physical address for LDA j may be obtained from the L2P entry and the command may be performed accordingly.

If the GTD entry for TDU(j) is not found in the GTD cache, the L2P engine 104 may then send a GTD entry fetch request with TDU(j) to DRAM 210 and retrieve the GTD entry for TDU(j) from DRAM 210. If the retrieved GTD entry is valid (e.g., the validity bit being 1 in the entry tag), the retrieved GTD entry may be inserted into the GTD cache 218. For valid GTD entries in the GTD 212, the corresponding TDUs are already loaded in the DRAM 210. For example, TDUs 214.1, 214.2, 214.3 and 214.4 are already loaded in the DRAM 210. If the retrieved GTD entry is invalid (e.g., the validity bit being 0 in the entry tag), this TDU(j) is not in the DRAM 210. A TDU space for TDU(j) may be reserved in the DRAM 210 and a load request for TDU(j) may be sent to the non-volatile storage device 202.

Figure 5:
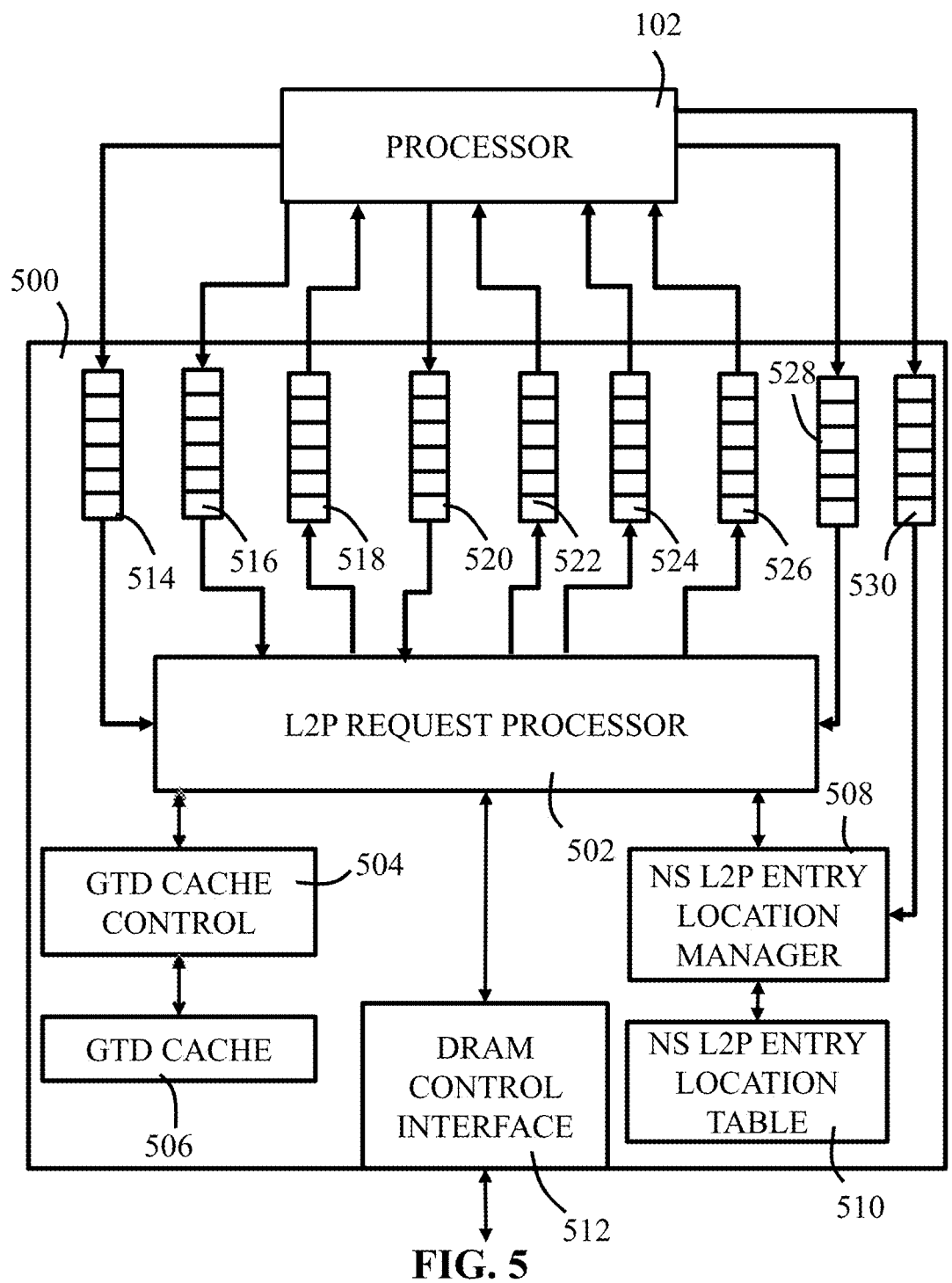
FIG. 5 schematically shows a L2P engine in in accordance with an embodiment of the present disclosure.

FIG. 5 schematically shows a L2P engine 500 in accordance with an embodiment of the present disclosure. The L2P engine 500 may be an embodiment of the L2P engine 104 in FIG. 1A. The L2P engine 500 may comprise a L2P request processor 502, a GTD cache control block 504, a GTD cache 506, a NS L2P entry location manager 508, a NS L2P entry location table 510, a DRAM control interface 512 and a plurality of queues for communication with the processor 102. The plurality of queues may include a L2P search request queue 514, a L2P update request queue 516, a TDU load request queue 518, a TDU load completion queue 520, a L2P search result queue 522, a L2P update result queue 524, a TDU flush request queue 526, a TDU flush completion queue 528 and a location table update queue 530. The GTD cache 506 may be an embodiment of the GTD cache 218 in FIG. 2 and the NS L2P entry location table 510 may be an embodiment of the NS-L2P-ELT 220 in FIG. 2.

The L2P engine 500 may receive L2P requests from the processor 102. The L2P requests may include search requests and update requests. A search request may be a request to search for a L2P translation for a LDA (e.g., LDA m with m being a 32-bit address in one embodiment). An update request may be a request to update a L2P translation for a LDA. The L2P search request queue 514 and L2P update request queue 516 may be buffers to temporarily store the received search requests and update requests before the requests may be processed by the L2P request processor 502.

In some embodiments, each of the search requests and update requests may contain a LDA (e.g., LDA j) and a namespace identifier (e.g., NSID i). The NS L2P entry location manager 508 may search the NS L2P entry location table 510 for the namespace identifier and obtain the memory address for the L2P entry if there is a hit. If there is no hit in the NS L2P entry location table 510, the TDU index for the LDA may be calculated (e.g., the most significant 22 bits of LDA m) and the GTD cache 506 may be searched to determine whether the TDU identified by the TDU index is already in the GTD cache 506. If there is a hit, the GTD entry is already in the GTD cache and the data tag of the GTD entry may contain the memory location of the TDU. The TDU may include a plurality of L2P entries (e.g., 1024 entries) that includes the L2P entry for the LDA.

If the L2P request is a L2P search request, the L2P entry may be fetched from the memory and returned to the processor 102. If the L2P request is a L2P update request, the L2P entry in the DRAM 210 may be updated. In one embodiment, the L2P engine 500 may send the search request results to the L2P search result queue 522 and update request results to the L2P update result queue 524, and the processor 102 may receive the search request results from the L2P search result queue 522 and update request results from the L2P update result queue 524.

If the search of the GTD cache 506 has no hit, a GTD entry fetch request with the TDU index for the TDU may be sent (e.g., via the DRAM control interface 512) to the DRAM (e.g., DRAM 210). After a GTD fetch request with the TDU index is sent to the DRAM 210, a GTD entry may be received from the DRAM 210 (e.g., from the GTD 212). When the GTD entry for the TDU identified by the TDU index is received by the L2P engine 500, the validity bit of the GTD entry may be checked to determine whether the GTD entry is valid. In one embodiment, after the lookup directory 212 is initialized in the DRAM 210, all entries may be invalid (e.g., the validity bit set to zero), and a GTD entry may become valid only after the corresponding TDU has been loaded from the L2P table 204. If the GTD entry received by the L2P engine 500 is valid, the GTD entry may inserted into the GTD cache 506. In one embodiment, the GTD cache control 504 may be configured to insert the GTD entry into the GTD cache 506. If, however, the GTD entry received by the L2P engine 500 is not valid, the L2P engine 500 may determine that the TDU has not been loaded from the L2P table 204 and a load request for the TDU (e.g., identified by the TDU index) may be sent to the NAND interface controller after a TDU space for the TDU to be loaded is reserved in the memory (e.g., DRAM 210) of the storage controller. In some embodiments, the L2P engine 500 may send a TDU load request to the processor 102. In one embodiment, the TDU load request may be pushed into the TDU load request queue 518 and retrieved and processed by the processor 102.

When a requested TDU has been successfully loaded into the DRAM 210, a TDU load completion message may be sent to the L2P engine 500. In one embodiment, a load completion message may be received in the TDU load completion queue 520 from the processor 102. The TDU load completion message may comprise the TDU index and memory location of the TDU (e.g., the data tag in a GTD entry). The L2P engine 500 may process the TDU load completion message similar to processing a valid GTD entry retrieved from the lookup directory 212. For example, the L2P engine 500 may update the GTD entry for this TDU in the lookup directory 212 (e.g., via the DRAM control interface 512) and update the GTD cache 506 (e.g., insert this GTD entry by the GTD cache control 504).

The L2P engine 500 may send TDU flush requests to the processor 102 and receive TDU flush completion notifications from the processor 102. For example, if a TDU in the DRAM 210 is dirty (e.g., the dirty bit being set), it may need to be flushed to the non-volatile storage device 202 to update the L2P address translation table 204. In one embodiment, a TDU flush request may be generated and pushed into the TDU flush request queue 526. Once the TDU flush has been completed, the processor 102 may send a flush completion message to the TDU flush completion queue 528.

The L2P engine 500 may also receive location table updates from the processor 102. For example, if a new namespace of the first type has been created and its corresponding L2P entries may be loaded into the memory and the NS L2P entry location table 510 may need to be updated. As another example, the NS L2P entry location table 510 may be updated when a namespace of the first type is deleted. In one embodiment, a location table update may be generated by the processor 102 and pushed into the location table update queue 530. The NS L2P entry location manager 508 may obtain the location table update from the location table update queue 530 and update the corresponding entry of the NS L2P entry location table 510.

Figure 6:
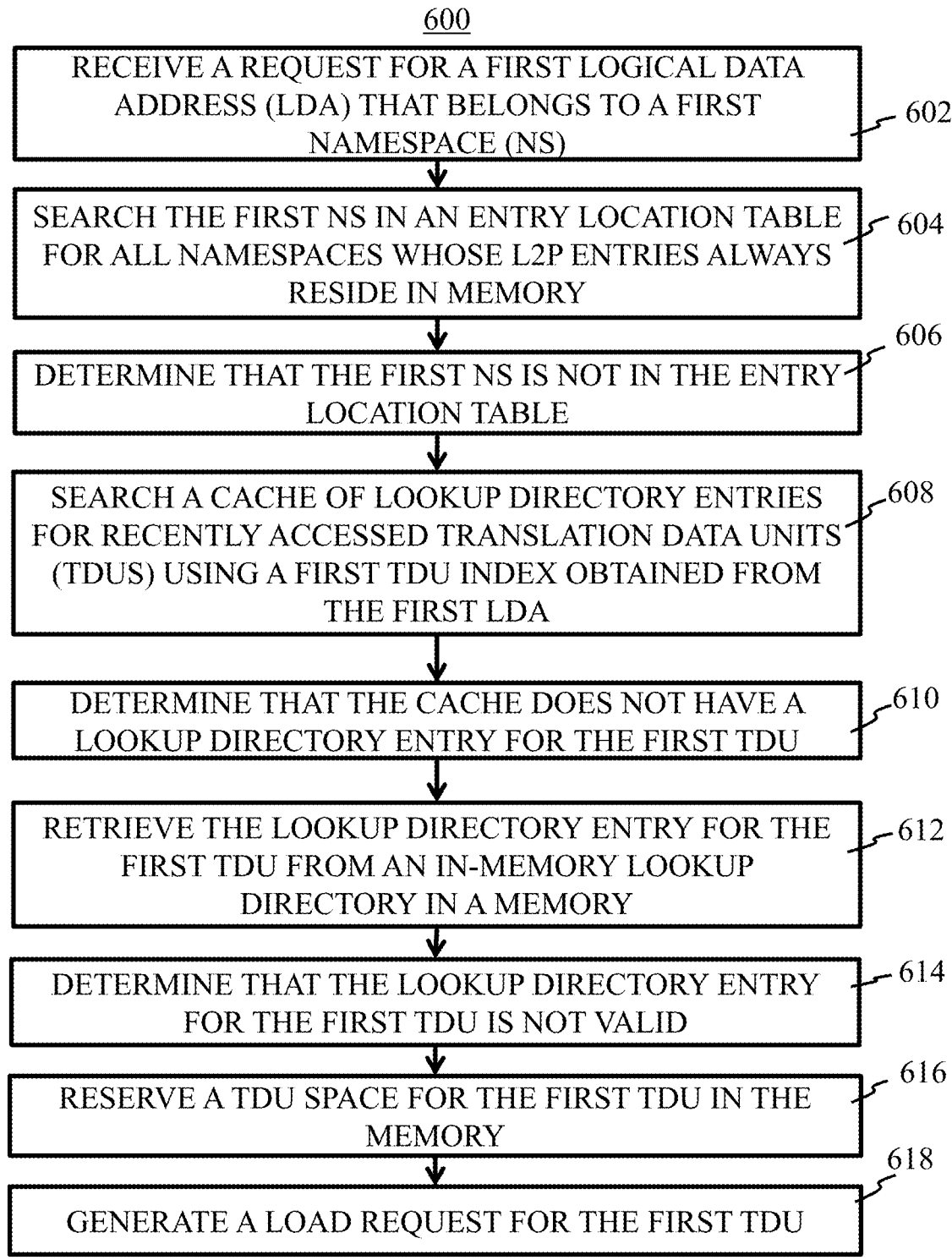
FIG. 6 is a flowchart of a process for using a partial L2P address translation table with multiple namespaces in accordance with an embodiment of the present disclosure.

FIG. 6 is a flowchart of a process 600 for using a partial L2P translation table with multiple namespaces in accordance with an embodiment of the present disclosure. At block 602, a request for a first logical data address (LDA) that belongs to a first namespace (NS) may be received. For example, a search request or update request for a LDA j with a namespace identifier NSID i may be received by the L2P engine 104. At block 604, an entry location table for all namespaces whose L2P entries always reside in memory may be searched. For example, the NS-L2P-ELT 220 may be searched for the first namespace using the NSID i. At block 606, it may be determined that the first NS is not in the entry location table. In one embodiment, each table entry of the NS-L2P-ELT 220 may contain a NSID and the NSID i may be searched against all NSIDs in the NS-L2P-ELT 220.

At block 608, a cache of lookup directory entries for recently accessed translation data units (TDUs) may be searched using the first TDU index obtained from the first LDA. L2P entries may be stored in translation data units (TDUs) and each TDU may contain up to 1024 L2P entries. In one embodiment, the TDU index may be the most significant 22 bits of a 32 bits LDA and the cache of lookup directory entries (e.g., GTD cache 506) may contain memory locations of recently accessed TDUs. At block 610, it may be determined that the cache of lookup directory entries does not have a lookup directory entry for the first TDU and at block 612, the lookup directory entry for the first TDU may be retrieved from an in-memory lookup directory. For example, the lookup directory 212 in the DRAM 210 may contain entries for all TDUs in the L2P translation table and a cache miss in the GTD cache 506 for the first TDU index may cause the lookup director entry for the first TDU be fetched from the DRAM 210. At block 614, it may be determined that the lookup directory entry for the first TDU is not valid. At block 616, a TDU space may be reserved for the first TDU in the memory and at block 618, a load request for the first TDU may be generated. For example, after the lookup director 212 is initialized, all entries may be invalid and any TDU that contains L2P entries for the second type of namespace may need to be loaded from the L2P table 204 when it is first requested. A TDU space may need to be reserved in the memory (e.g., DRAM 210) for the TDU to be loaded and the TDU load request may be pushed into the TDU load request queue 518.

In various embodiments, the process 600 and the L2P engine 104 (or L2P engine 500) may have one or more portions or in its entirety be implemented using hardware (e.g., a field-programmable gate array (FPGA) or an application-specific IC (ASIC)), firmware, a computer processor executing software instructions, or any suitable combination. If the L2P engine 104 (or L2P engine 500) is implemented in software, the storage units (e.g., queues, cache and ELT) may be implemented in the on-chip memory 106 or off-chip memory (e.g., DRAM 210). Moreover, the lookup directory 212 may be stored in the on-chip memory 106 in at least one embodiment.

In some embodiments, a L2P address translation table may be divided into several portions according to namespaces. Namespaces of a non-volatile storage system may be categorized into two different types based on performance requirement. For some namespaces, referred to as a first type, high throughput for accessing the storage space of these namespaces may be critical, the L2P entries belonging to these namespaces may always stay in DRAM. For other namespaces, referred to as a second type, high throughput for accessing the storage space of these namespaces is not critical, the L2P entries belonging to these namespaces may be swapped in and out when they are needed. Therefore, embodiments may achieve a better balance between the large size of DRAM used for large capacity SSDs and the high-throughput requirement for some applications.

Partial logical-to-physical address translation table with multiple namespaces in storage controllers may reduce the memory space used for logical-to-physical address translation in storage controllers. At any time, only a subset of a full L2P address translation table may be loaded into the memory of a storage controller. For L2P entries always residing in memory, an entry location table (e.g., NS-L2P-ELT 220) may be maintained in cache and each entry of the entry location table may contain the start LDA of a respective namespace and the start memory address for the L2P entries of the namespace. Moreover, an in-memory lookup directory (e.g., GTD 212) for translation data units (TDUs) that contain L2P entries for the second type of namespaces may be maintained in the memory of the storage controller. The lookup directory may keep track of which TDU may have been loaded into the memory space of the storage controllers.

Every time when a TDU is loaded from a non-volatile storage device to the memory of the storage controller or flushed from the memory of the storage controller to the non-volatile storage device, the corresponding lookup directory entry may be updated. One TDU may be loaded into any available TDU space in the memory of the storage controller and the lookup directory may keep track of where in the memory the TDU is loaded into. If the lookup directory entry for a TDU is invalid, it means that this TDU is not in the memory of the storage controller and a load request for this TDU may be sent to non-volatile storage device. In some embodiments, the recently accessed lookup directory entries may be maintained in a cache and the cache may be checked first to determine whether the lookup directory entry corresponding to a TDU is available in the cache.

In an exemplary embodiment, there is provided a method that may comprise: receiving a request for a first logical data address (LDA) that belongs to a first namespace (NS); searching the first NS in an entry location table (ELT) for all namespaces whose L2P entries always reside in memory; determining that the first NS is not in the ELT; searching a cache of lookup directory entries of recently accessed translation data units (TDUs) for a first TDU using a first TDU index obtained from the first LDA, the first TDU containing a logical-to-physical (L2P) entry for the first LDA; determining that the cache does not have a lookup directory entry for the first TDU; retrieving the lookup directory entry for the first TDU from an in-memory lookup directory in a memory; determining that the lookup directory entry for the first TDU is not valid; reserving a TDU space for the first TDU in the memory; and generating a load request for the first TDU.

In an embodiment, the method may further comprise receiving a request for a second LDA that belongs to a second NS; searching the second NS in the ELT; determining that the second NS has an entry in the ELT; and obtaining a L2P entry for the second LDA using the entry for the second NS in the ELT.

In an embodiment, the entry for the second NS in the ELT may comprise a start LDA for the second NS and a start memory address for L2P entries for the second NS, and the L2P entry for the second LDA may be obtained from a memory address calculated as: (the second LDA—the start LDA for the second NS)*a number of bytes per L2P entry+the start memory address for L2P entries for the second NS, in which "*" may be a multiplication operator.

In an embodiment, at least one of the request for the first LDA and the request for the second LDA may be to service a virtual function from a host that implements virtualization.

In an embodiment, the first TDU index may be calculated by dividing the first LDA by a total number of L2P entries in the first TDU.

In an embodiment, the method may further comprise retrieving a lookup directory entry for a second TDU from the in-memory lookup directory; determining that the lookup directory entry for the second TDU is valid; and updating the cache of lookup directory entries with the lookup directory entry for the second TDU.

In an embodiment, the method may further comprise receiving a TDU load completion message for the first TDU; updating the lookup directory entry for the first TDU in the in-memory lookup directory with a memory location of the first TDU; and updating the lookup directory entry for the first TDU in the cache of lookup directory entries with the memory location of the first TDU.

In another exemplary embodiment, there is provided an apparatus that may comprise: a processor, and a logical-to-physical (L2P) translation engine. The L2P translation engine may comprise an entry location table (ELT) for all namespaces whose L2P entries always reside in memory and a cache of lookup directory entries of recently accessed translation data units (TDUs). The L2P translation engine may be configured to: receive a request for a first logical data address (LDA) that belongs to a first namespace (NS) from the processor; search the first NS in the ELT; determine that the first NS is not in the ELT; search the cache for a first TDU using a first TDU index obtained from the first LDA, the first TDU containing a logical-to-physical (L2P) entry for the first LDA; determine that the cache does not have a lookup directory entry for the first TDU; retrieve the lookup directory entry for the first TDU from an in-memory lookup directory in a memory; determine that the lookup directory entry for the first TDU is not valid; reserve a TDU space for the first TDU in the memory; and generate a load request for the first TDU.

In an embodiment, the L2P translation engine may be further configured to: receive a request for a second LDA that belongs to a second NS; search the second NS in the ELT; determine that the second NS has an entry in the ELT; and obtain a L2P entry for the second LDA using the entry for the second NS in the ELT.

In an embodiment, the entry for the second NS in the ELT may comprise a start LDA for the second NS and a start memory address for L2P entries for the second NS, and the L2P entry for the second LDA may be obtained from a memory address calculated as: (the second LDA—the start LDA for the second NS)*a number of bytes per L2P entry+the start memory address for L2P entries for the second NS, in which "*" is a multiplication operator.

In an embodiment, at least one of the request for the first LDA and the request for the second LDA may be to service a virtual function from a host that implements virtualization.

In an embodiment, the first TDU index may be calculated by dividing the first LDA by a total number of L2P entries in the first TDU.

In an embodiment, the L2P translation engine may be further configured to: retrieve a lookup directory entry for a second TDU from the in-memory lookup directory; determine that the lookup directory entry for the second TDU is valid; and update the cache of lookup directory entries with the lookup directory entry for the second TDU.

In an embodiment, the L2P translation engine may be further configured to: receive a TDU load completion message for the first TDU; update the lookup directory entry for the first TDU in the in-memory lookup directory with a memory location of the first TDU; and update the lookup directory entry for the first TDU in the cache of lookup directory entries with the memory location of the first TDU.

In yet another exemplary embodiment, disclosed herein may also include a non-transitory machine-readable medium having executable instructions, that the executable instructions, when executed by a storage controller, may cause the storage controller to: receive a request for a first logical data address (LDA) that belongs to a first namespace (NS); search the first NS in an entry location table (ELT) for all namespaces whose L2P entries always reside in memory; determine that the first NS is not in the ELT; search a cache of lookup directory entries of recently accessed translation data units (TDUs) for a first TDU using a first TDU index obtained from the first LDA, the first TDU containing a logical-to-physical (L2P) entry for the first LDA; determine that the cache does not have a lookup directory entry for the first TDU; retrieve the lookup directory entry for the first TDU from an in-memory lookup directory in a memory; determine that the lookup directory entry for the first TDU is not valid; reserve a TDU space for the first TDU in the memory; and generate a load request for the first TDU.

In an embodiment, the executable instructions, when executed by the storage controller, may further cause the storage controller to: receive a request for a second LDA that belongs to a second NS; search the second NS in the ELT; determine that the second NS has an entry in the ELT; and obtain a L2P entry for the second LDA using the entry for the second NS in the ELT.

In an embodiment, the entry for the second NS in the ELT may comprise a start LDA for the second NS and a start memory address for L2P entries for the second NS, and the L2P entry for the second LDA may be obtained from a memory address calculated as: (the second LDA—the start LDA for the second NS)*a number of bytes per L2P entry+the start memory address for L2P entries for the second NS, in which "*" is a multiplication operator.

In an embodiment, at least one of the request for the first LDA and the request for the second LDA may be to service a virtual function from a host that implements virtualization.

In an embodiment, the first TDU index may be calculated by dividing the first LDA by a total number of L2P entries in the first TDU.

In an embodiment, the executable instructions, when executed by the storage controller, may further cause the storage controller to: retrieve a lookup directory entry for a second TDU from the in-memory lookup directory; determine that the lookup directory entry for the second TDU is valid; and update the cache of lookup directory entries with the lookup directory entry for the second TDU.

In an embodiment, the executable instructions, when executed by the storage controller, may further cause the storage controller to: receive a TDU load completion message for the first TDU; update the lookup directory entry for the first TDU in the in-memory lookup directory with a memory location of the first TDU; and update the lookup directory entry for the first TDU in the cache of lookup directory entries with the memory location of the first TDU.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as SSD hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving a request for a first logical data address (LDA) that belongs to a first namespace (NS);
searching the first NS in an entry location table (ELT) for all namespaces whose L2P entries always reside in memory;
determining that the first NS is not in the ELT;
searching a cache of lookup directory entries of recently accessed translation data units (TDUs) for a first TDU using a first TDU index obtained from the first LDA, the first TDU containing a logical-to-physical (L2P) entry for the first LDA;
determining that the cache does not have a lookup directory entry for the first TDU;
retrieving the lookup directory entry for the first TDU from an in-memory lookup directory in a memory;
determining that the lookup directory entry for the first TDU is not valid;
reserving a TDU space for the first TDU in the memory; and
generating a load request for the first TDU.

2. The method of claim 1, further comprising:
receiving a request for a second LDA that belongs to a second NS;
searching the second NS in the ELT;
determining that the second NS has an entry in the ELT; and
obtaining a L2P entry for the second LDA using the entry for the second NS in the ELT.

3. The method of claim 2, wherein the entry for the second NS in the ELT comprises a start LDA for the second NS and a start memory address for L2P entries for the second NS, and the L2P entry for the second LDA is obtained from a memory address calculated as: (the second LDA—the start LDA for the second NS)*a number of bytes per L2P entry+the start memory address for L2P entries for the second NS, in which "*" is a multiplication operator.

4. The method of claim 3, wherein at least one of the request for the first LDA and the request for the second LDA is to service a virtual function from a host that implements virtualization.

5. The method of claim 1, wherein the first TDU index is calculated by dividing the first LDA by a total number of L2P entries in the first TDU.

6. The method of claim 1, further comprising:
retrieving a lookup directory entry for a second TDU from the in-memory lookup directory;
determining that the lookup directory entry for the second TDU is valid; and
updating the cache of lookup directory entries with the lookup directory entry for the second TDU.

7. The method of claim 1, further comprising:
receiving a TDU load completion message for the first TDU;
updating the lookup directory entry for the first TDU in the in-memory lookup directory with a memory location of the first TDU; and
updating the lookup directory entry for the first TDU in the cache of lookup directory entries with the memory location of the first TDU.

8. An apparatus, comprising:
a processor, and
a logical-to-physical (L2P) translation engine comprising an entry location table (ELT) for all namespaces whose L2P entries always reside in memory and a cache of lookup directory entries of recently accessed translation data units (TDUs), the L2P translation engine being configured to:
receive a request for a first logical data address (LDA) that belongs to a first namespace (NS) from the processor;
search the first NS in the ELT;
determine that the first NS is not in the ELT;
search the cache for a first TDU using a first TDU index obtained from the first LDA, the first TDU containing a logical-to-physical (L2P) entry for the first LDA;
determine that the cache does not have a lookup directory entry for the first TDU;
retrieve the lookup directory entry for the first TDU from an in-memory lookup directory in a memory;
determine that the lookup directory entry for the first TDU is not valid;
reserve a TDU space for the first TDU in the memory; and
generate a load request for the first TDU.

9. The apparatus of claim 8, wherein the L2P translation engine is further configured to:
receive a request for a second LDA that belongs to a second NS;
search the second NS in the ELT;
determine that the second NS has an entry in the ELT; and
obtain a L2P entry for the second LDA using the entry for the second NS in the ELT.

10. The apparatus of claim 9, wherein the entry for the second NS in the ELT comprises a start LDA for the second NS and a start memory address for L2P entries for the second NS, and the L2P entry for the second LDA is obtained from a memory address calculated as: (the second LDA—the start LDA for the second NS)*a number of bytes per L2P entry+the start memory address for L2P entries for the second NS, in which "*" is a multiplication operator.

11. The apparatus of claim 10, wherein at least one of the request for the first LDA and the request for the second LDA is to service a virtual function from a host that implements virtualization.

12. The apparatus of claim 8, wherein the first TDU index is calculated by dividing the first LDA by a total number of L2P entries in the first TDU.

13. The apparatus of claim 8, wherein the L2P translation engine is further configured to:
retrieve a lookup directory entry for a second TDU from the in-memory lookup directory;
determine that the lookup directory entry for the second TDU is valid; and
update the cache of lookup directory entries with the lookup directory entry for the second TDU.

14. The apparatus of claim 8, wherein the L2P translation engine is further configured to:
receive a TDU load completion message for the first TDU;
update the lookup directory entry for the first TDU in the in-memory lookup directory with a memory location of the first TDU; and
update the lookup directory entry for the first TDU in the cache of lookup directory entries with the memory location of the first TDU.

15. A non-transitory machine-readable medium having executable instructions, wherein the executable instructions, when executed by a storage controller, causes the storage controller to:
receive a request for a first logical data address (LDA) that belongs to a first namespace (NS);
search the first NS in an entry location table (ELT) for all namespaces whose L2P entries always reside in memory;
determine that the first NS is not in the ELT;
search a cache of lookup directory entries of recently accessed translation data units (TDUs) for a first TDU using a first TDU index obtained from the first LDA, the first TDU containing a logical-to-physical (L2P) entry for the first LDA;
determine that the cache does not have a lookup directory entry for the first TDU;
retrieve the lookup directory entry for the first TDU from an in-memory lookup directory in a memory;
determine that the lookup directory entry for the first TDU is not valid;
reserve a TDU space for the first TDU in the memory; and
generate a load request for the first TDU.

16. The non-transitory machine-readable medium of claim 15, wherein the executable instructions when executed by the storage controller, further causes the storage controller to: receive a request for a second LDA that belongs to a second NS; search the second NS in the ELT; determine that the second NS has an entry in the ELT; and obtain a L2P entry for the second LDA using the entry for the second NS in the ELT.

17. The non-transitory machine-readable medium of claim 16, wherein the entry for the second NS in the ELT comprises a start LDA for the second NS and a start memory address for L2P entries for the second NS, and the L2P entry for the second LDA is obtained from a memory address calculated as: (the second LDA—the start LDA for the second NS)*a number of bytes per L2P entry+the start memory address for L2P entries for the second NS, in which "*" is a multiplication operator.

18. The non-transitory machine-readable medium of claim 17, wherein at least one of the request for the first LDA and the request for the second LDA is to service a virtual function from a host that implements virtualization.

19. The non-transitory machine-readable medium of claim 15, wherein the first TDU index is calculated by dividing the first LDA by a total number of L2P entries in the first TDU.

20. The non-transitory machine-readable medium of claim 15, wherein the executable instructions, when executed by the storage controller, further causes the storage controller to:
- retrieve a lookup directory entry for a second TDU from the in-memory lookup directory;
- determine that the lookup directory entry for the second TDU is valid; and
- update the cache of lookup directory entries with the lookup directory entry for the second TDU.

21. The non-transitory machine-readable medium of claim 15, wherein the executable instructions, when executed by the storage controller, further causes the storage controller to:
- receive a TDU load completion message for the first TDU;
- update the lookup directory entry for the first TDU in the in-memory lookup directory with a memory location of the first TDU; and
- update the lookup directory entry for the first TDU in the cache of lookup directory entries with the memory location of the first TDU.

* * * * *